United States Patent [19]
Cowen et al.

[11] Patent Number: 5,636,307
[45] Date of Patent: Jun. 3, 1997

[54] FIBER OPTIC MICROCABLE PRODUCED WITH RADIATION CURED COMPOSITE

[75] Inventors: Steven J. Cowen; Christopher M. Young, both of San Diego; James H. Dombrowski, Carlsbad, all of Calif.

[73] Assignee: The United States of America as represented by the Secretary of the Navy, Washington, D.C.

[21] Appl. No.: 316,710

[22] Filed: Nov. 22, 1993

Related U.S. Application Data

[63] Continuation of Ser. No. 573,946, Aug. 28, 1990, abandoned, and a continuation-in-part of Ser. No. 199,820, May 26, 1988, Pat. No. 5,593,736, and Ser. No. 197,491, May 23, 1988, Pat. No. 5,259,055.

[51] Int. Cl.$^6$ ............................ G02B 5/172; B05D 3/06
[52] U.S. Cl. ..................... 385/102; 385/127; 385/128; 427/163.2; 522/6
[58] Field of Search ............................ 385/102, 127, 385/128; 427/163.2; 522/6

[56] References Cited

U.S. PATENT DOCUMENTS

| | | | |
|---|---|---|---|
| 4,514,037 | 4/1985 | Bishop et al. | 350/96.29 |
| 4,534,618 | 8/1985 | Bruggendieck | 350/96.23 |
| 4,634,217 | 1/1987 | Levacher et al. | 350/96.29 |
| 4,770,898 | 9/1988 | Sugai et al. | 427/54.1 |
| 4,798,852 | 1/1989 | Zimmerman et al. | 350/96.33 |
| 4,932,750 | 6/1990 | Ansel et al. | 427/54.1 |

OTHER PUBLICATIONS

Pasterneck, G; "Ultraviolet Light ... Optical Fibers"; Sep. 17–19, 1986 Conf; London, Eng.; pp. 13/1–11; abst. only provided.

*Primary Examiner*—Nelson Moskowitz
*Attorney, Agent, or Firm*—Harvey Fendelman; Peter A. Lipovsky; Michael A. Kagan

[57] ABSTRACT

The invention provides a fiber reinforced optical microcable comprised of a buffered optical waveguide coated with a fiber reinforced protective sheath formed of an ultraviolet light cured resin. The microcable is manufactured by soaking reinforcing fibers in the UV curable resin, placing the wetted fibers around the buffered optical waveguide, squeezing the fibers and buffered optical waveguide through a die, and then curing the resin with ultraviolet light.

21 Claims, 5 Drawing Sheets

FIBER OPTIC MICROCABLE PRODUCED WITH RADIATION CURED COMPOSITE

CROSS REFERENCE TO RELATED APPLICATIONS

This application is a continuing application of co-pending U.S. Patent Application 07/573,946, filed Aug. 28, 1990 by Stephen J. Cowen and James H. Dombrowski, now abandoned.

This is a continuation of application Ser. No. 07/573,946 filed Aug. 20, 1990, and a continuation-in-part of the patents set forth below.

This application is a continuation-in-part of U.S. Patent Application Ser. No. 07/199,820 filed May 26, 1988 by Steven J. Cowen, Christopher M. Young, James H. Dombrowski, Michael E. Kono, and James H. Daughtry, now U.S. Pat. No. 5,593,736 and of U.S. Patent Application Ser. No. 07/197,491 filed May 23, 1988 by Steven J. Cowen, Christopher M. Young and James H. Dombrowski now U.S. Pat. No. 5,259,055.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to the field of fiber optic communications and more particularly to fiber optic cables. Specifically, the present invention provides a fiber optic microcable having a uniform cross-sectional dimension and a continuous length greater than conventional microcables.

A fiber optic microcable is basically comprised of a glass or plastic fiber core, a buffer, and a protective sheath. The protective sheath is typically composed of a heat polymerized organic resin impregnated with reinforcing fibers. Conventional resin materials are typically polymerized or cured at temperatures which may exceed 200° C. These temperatures can damage the ultraviolet light cured buffer layers present on state-of-the-art optical fibers resulting in unacceptable degradation of optical performance. One alternative is to use heat resistant buffer layers composed of silicone rubber or thermoplastic. However, these materials greatly increase the costs of the microcable. An alternative to using expensive buffer materials is to increase the exposure time of the resin to a more moderate curing temperature for a longer period of time as compared to curing the resin at higher temperatures. This solution disadvantageously requires either a very long production oven which may be 100 to 200 feet long or a microcable production rate limited to approximately four inches per second. Both of these methods increase the microcable production costs.

A further problem associated with heat curable polymeric sheathing materials is that the sheathing tends to deform while curing, causing the microcable to become out of round. This results in a microcable having a nonuniform, noncircular cross section which creates difficulties when precision winding the microcable onto spools. Still another problem with heat curable polymeric resins is limited pot life which sets an upper limit on the continuous length of fiber optic microcable which can be fabricated in a given production run. Physical properties of heat curable resins tend to vary throughout their pot lives thereby creating additional manufacturing difficulties. All of these problems combine to increase the costs of fiber optic microcable applications and limit the maximum obtainable continuous lengths of microcable to at most 10 kilometers. Therefore, there is a continuing need to develop a fiber optic microcable which can be more readily manufactured to greater lengths within acceptable tolerances and costs.

SUMMARY OF THE INVENTION

The present invention provides a fiber optic microcable that overcomes the dimensional uniformity problems, length limitations and cost disadvantages inherent in the prior art. The fiber optic microcable includes an optical fiber core surrounded by a buffer and a protective sheath. The sheath consists of an ultraviolet light curable resin impregnated with fibers to enhance the physical strength characteristics of the microcable. The resin polymerizes almost instantaneously upon exposure to ultraviolet light. This permits the microcable to be manufactured at rates greater than 1 meter per second by processing it through an ultraviolet light processor. The length of the lamp bath is determined by the cure rate of the resin and the intensitiy of the ultraviolet light falling incident upon the resin. Because curing takes place almost immediately, there is no tendency for the resin to sag out of round as there is for microcable cured in a long oven. Therefore, the resulting microcable is uniformly round over its entire length. Another significant advantage with microcables having an outer sheath composed of an ultraviolet light curable resin is that the resin temperatures attained during polymerization are less than 100° C. as opposed to temperatures greater than 200° C. for heat curable resins. The lower temperatures enable the microcables to be fabricated with standard state-of-the-art telecommunications optical fiber using ultraviolet light cured buffers which are relatively inexpensive.

One advantage of the present invention is to provide a fiber optic microcable that has a uniformly round cross section over the length of the microcable. Another advantange of the present invention is to provide a microcable that can be fabricated in lengths that exceed 10 kilometers. A very important advantage of the present invention is to provide a fiber optic microcable which can be cured at less than 100° C. by incorporating a resin that is cured upon exposure to ultraviolet light. This latter advantage is important because it enables fiber optic microcables to be fabricated with optical waveguide buffers that would otherwise be damaged at the temperatures required to cure heat cured resins. Furthermore, the present invention provides a fiber optic microcable which can be manufactured at rates which exceed 1 meter per second.

Other advantages of the invention will become apparent from the following detailed description of the invention when considered in conjunction with the accompanying drawings.

DESCRIPTION OF THE PREFERRED EMBODIMENT

Figure 1:
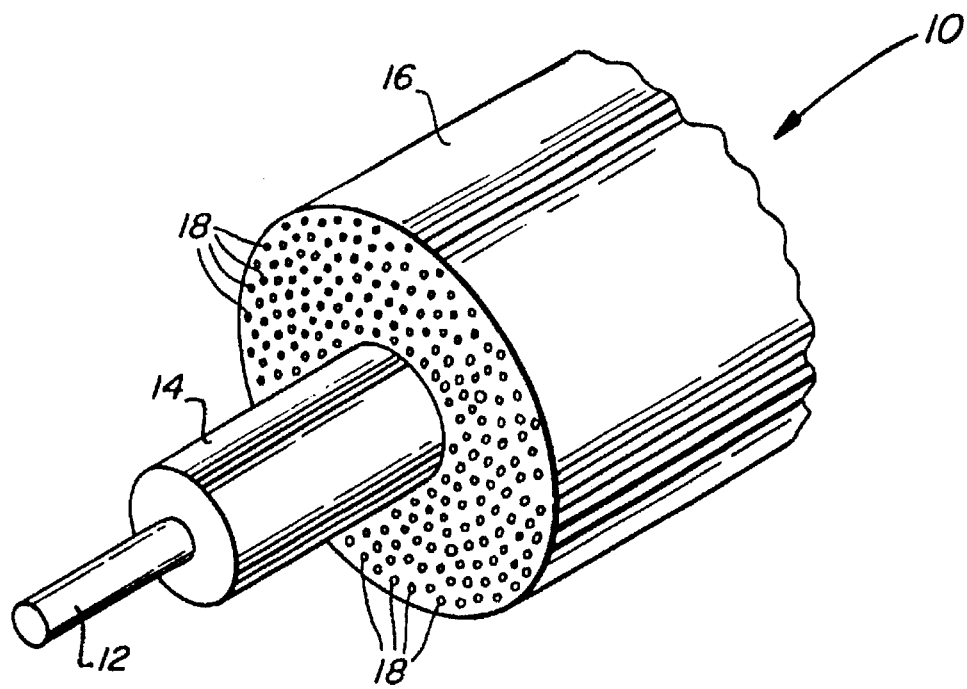
FIG. 1 is a breakaway view of the fiber optic microcable.

Referring now to FIG. 1 wherein like reference numerals designate like or similar parts throughout the several views, there is illustrated a fiber optic microcable 10 for conveying pulses of light. The microcable includes an optical fiber core 12 surrounded by a buffer 14 and a protective sheath 16 composed of an ultraviolet light cured polymeric resin impregnated with reinforcing fibers 18. By way of example, fiber core 12 may be Corning single mode dispersion shifted optical fiber, and buffer 14 may be Corning CPC 3 buffer. Reference to the optical fiber core implicitly includes reference to cladding (not shown) and sub- strate (not shown) surrounding the core. It is to be understood that all hereinafter references to the core also refer to the cladding and substrate. Fibers 18, which may be fiberglass filaments grouped as yarns or rovings, enhance the resistance of the microcable to physical damage. Although the fibers have been described as being composed of fiberglass, it is to be understood that it is within the scope of this invention for the fibers to be composed of other materials, as for example, boron, nylon, carbon graphite, or aromatic polyamide polymers such as "KEVLAR," a product of the Dupont Chemical Corporation, and which may be grouped as yarns, rovings or single filaments. The fibers are radially suspended in the resin around and parallel to optical fiber core 12. By way of example, fibers 18 may be Corning fiberglass ECG150-1/0-.7Z with a 603-0 finish. The reinforcing fibers may constitute 50 to 90 percent by volume of the fiber/resin composite mixture.

Microcable 10 has a uniformly concentric cross-sectional area attributable to rapid cure of the ultraviolet light curable resin. Although fibers 18 have been described as running parallel to optical fiber core 12, it is within the scope of the invention for fibers 18 to be suspended in other patterns in the resin, as for example a helical or woven pattern around optical fiber core 12.

Figure 4:
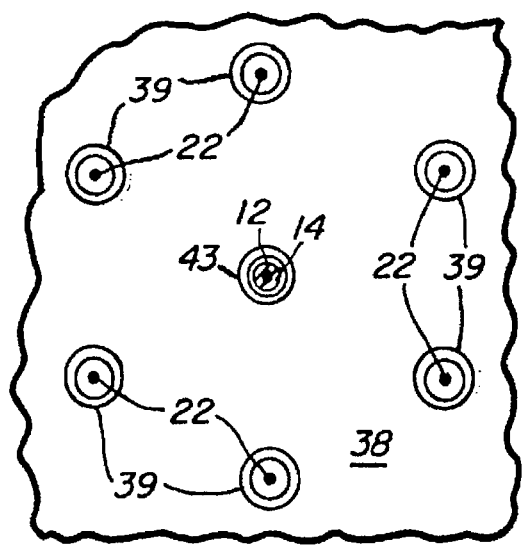
FIG. 4 is a view of the comb plate along line 4—4 of FIG. 2.
Figure 3:
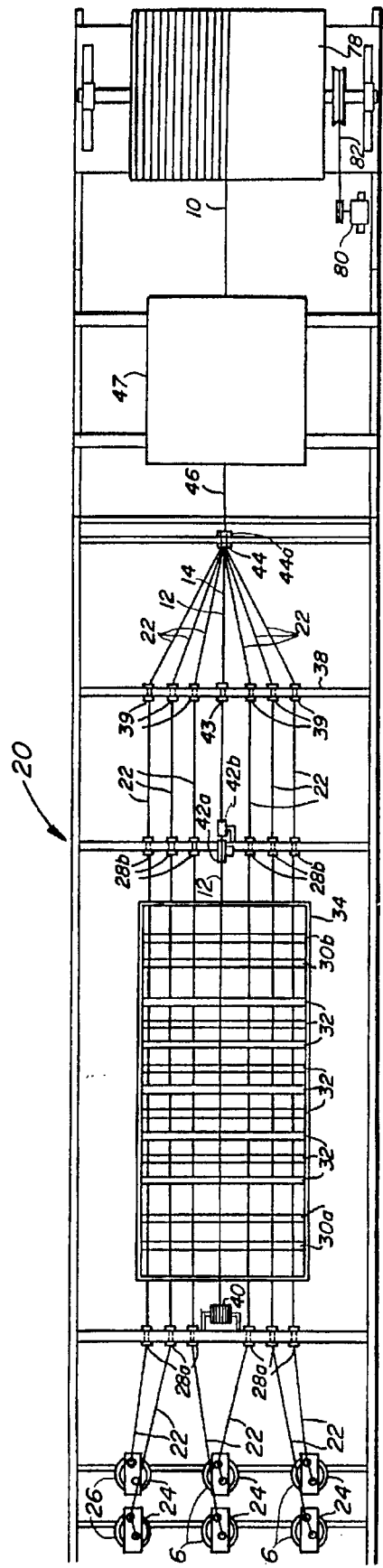
FIG. 3 is a plan view of a machine for manufacturing fiber optic microcable.
Figure 2:
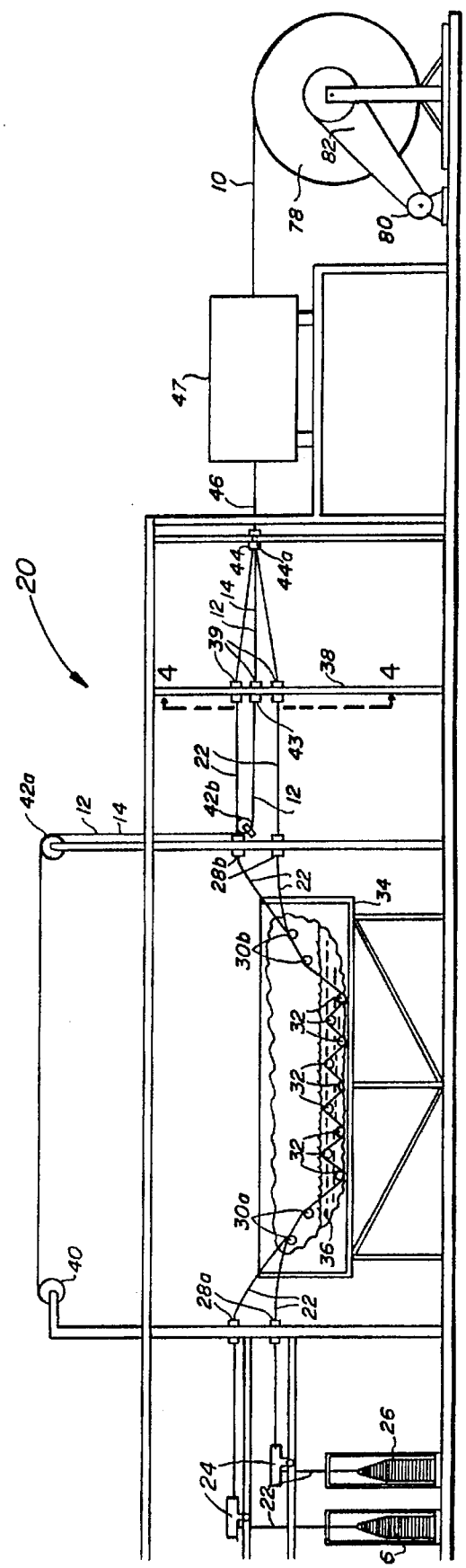
FIG. 2 is an elevation view of a machine for manufacturing fiber optic microcable.

FIGS. 2 and 3 show a machine 20 for manufacturing fiber reinforced, ultraviolet light curable optic fiber microcable 10 fabricated by dispensing fiberglass yarns 22 from storage bobbins 26. The yarns are subjected to back tension, which may be 0.1 Newton, controlled by textile tensioners 24. The yarns individually drawn through ceramic guides 28a and then over a first set of guide pins 30a. The yarns proceed through a staggered series of ceramic pins 32 in a temperature controlled wetting pan 34 containing an ultraviolet light curable resin 36. The resin is maintained between 27° and 70° C. in which yarns 22 are wetted. Any air which may become entrapped in the yarns is released as the wetted yarns pass over and under ceramic pins 32. Referring to FIGS. 2, 3 and 4, collectively, the wetted yarns are drawn over a second set of guide pins 30b, exit wetting pan 34 and then individually pass through ceramic guides 28b. The wetted yarns proceed through ceramic guides 39 mounted in comb plate 38 so that yarns 22 are radially positioned around optical fiber core 12 and buffer 14. The fiber core and buffer are integrally fed from a spool 40, around sheaves 42a and 42b, and on through ceramic guide 43 mounted in comb plate 38. Although FIGS. 2, 3 and 4 depict six yarns 22 being processed, it is to be understood that FIGS. 2, 3 and 4 represent the invention by way of example only. Within the scope of the invention, fewer or greater numbers of yarns 22 may be utilized than are actually shown.

After exiting comb plate 38, yarns 22 and optical fiber core 12 with accompanying buffer 14 converge as they pass through a circular aperture 44 of a heated tungsten-carbide forming die 44a to form a matrix 46 as shown in FIGS. 2 and 3. The diameter of aperture 44 determines the diameter and fiber/resin ratio of microcable 10.

Numerical reference 47 represents alternative species of methods for curing matrix 46. The first species is encompassed within lamp housing 48 illustrated in FIGS. 5 and 6. The second species is encompassed within lamp housings 62 and 74 illustrated in FIGS. 7, 8 and 9.

Figure 6:
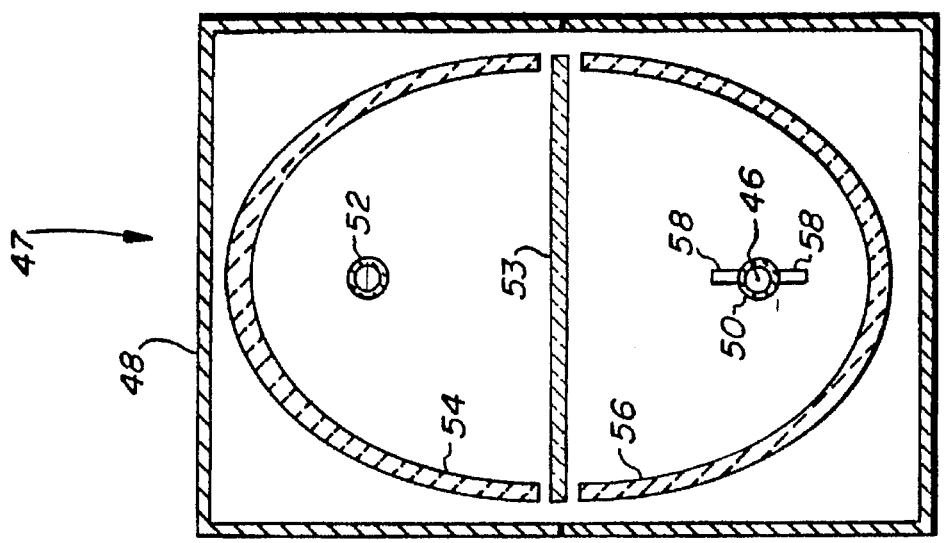
FIG. 6 is a cross-sectional end view of the ultraviolet light curing station along line 6—6 of FIG. 5.
Figure 5:
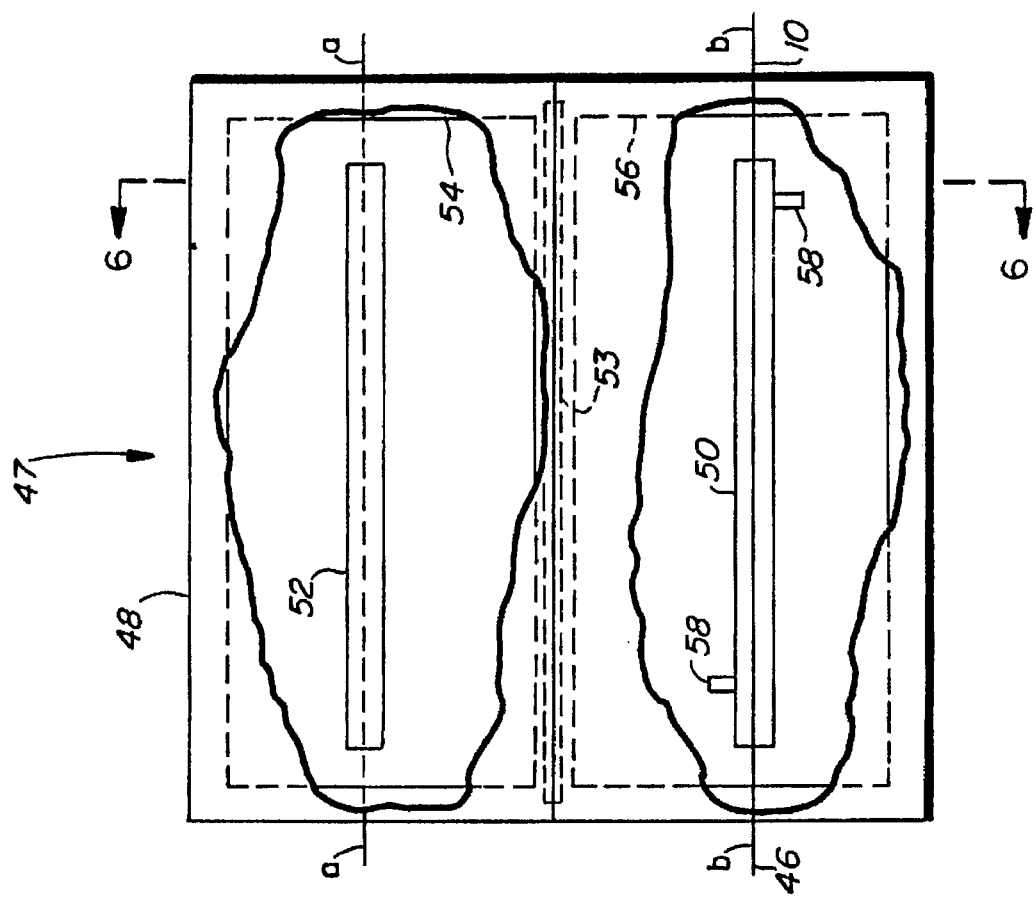
FIG. 5 is a plan view of an ultraviolet light curing station.

A single-stage method for curing matrix 46 is illustrated in FIGS. 5 and 6 wherein after exiting aperture 44 shown in FIGS. 2 and 3, matrix 46 enters a lamp housing 48. The matrix passes through a quartz tube 50 within the lamp housing in approximately 0.5 seconds through which it is irradiated at an intensity of approximately 100,000 microwatts/cm$^2$ by a single-stage electromagnetic radiation source 52 emitting ultraviolet light at a wavelength of anywhere from 290 to 400 nanometers. Quartz tube 50 shields matrix 46 from infrared radiation generated by electromagnetic radiation source 52 while being transparent to ultraviolet radiation. Quartz tube 50 may advantageously be filled with an inert gas such as nitrogen or helium so that matrix 46 is immersed within an inert gas atmosphere to improve cooling of the microcable while curing and to prevent undesirable chemical reactions from occuring between atmospheric oxygen and the resin. A quartz plate 53, which may be 0.32 cm thick, is mounted between electromagnetic radiation source 52 and quartz tube 50 to further shield matrix 46 from infrared radiation. The longitudinal axis of electromagnetic radiation source 52 is coincident with a focal axis a—a of a semi-elliptically shaped mirror 54. The longitudinal axis of quartz tube 50 is coincident with a focal axis b—b of a semi-elliptically shaped mirror 56. The reflective concave surface of mirror 54 faces the reflective concave surface of mirror 56 so that the reflective surfaces of both mirrors define an elliptical mirror having focal axes a—a and b—b.

Ultraviolet light from electromagnetic radiation source 52 both propagates directly towards matrix 46 and reflects off of mirror 54 to mirror 56, and then converges on focal axis b—b so that matrix 46 is irradiated from a 360° field. Dry nitrogen injected into quartz tube 50 through nipples 58 displaces oxygen which can inhibit polymerization of matrix 46 and cools the matrix while it cures. Matrix 46 cures almost instantaneously upon exposure to the ultraviolet light and is thus transformed into a completed microcable 10. Of course, matrix 46 may be conveyed through two lamp housings 48 arranged in series in order to increase the ultraviolet light exposure of matrix 46 as a way of speeding up the curing process of matrix 46, providing the temperature of the curing matrix 46 does not reach a level that would degrade any of the materials that comprise matrix 46.

Figure 7:
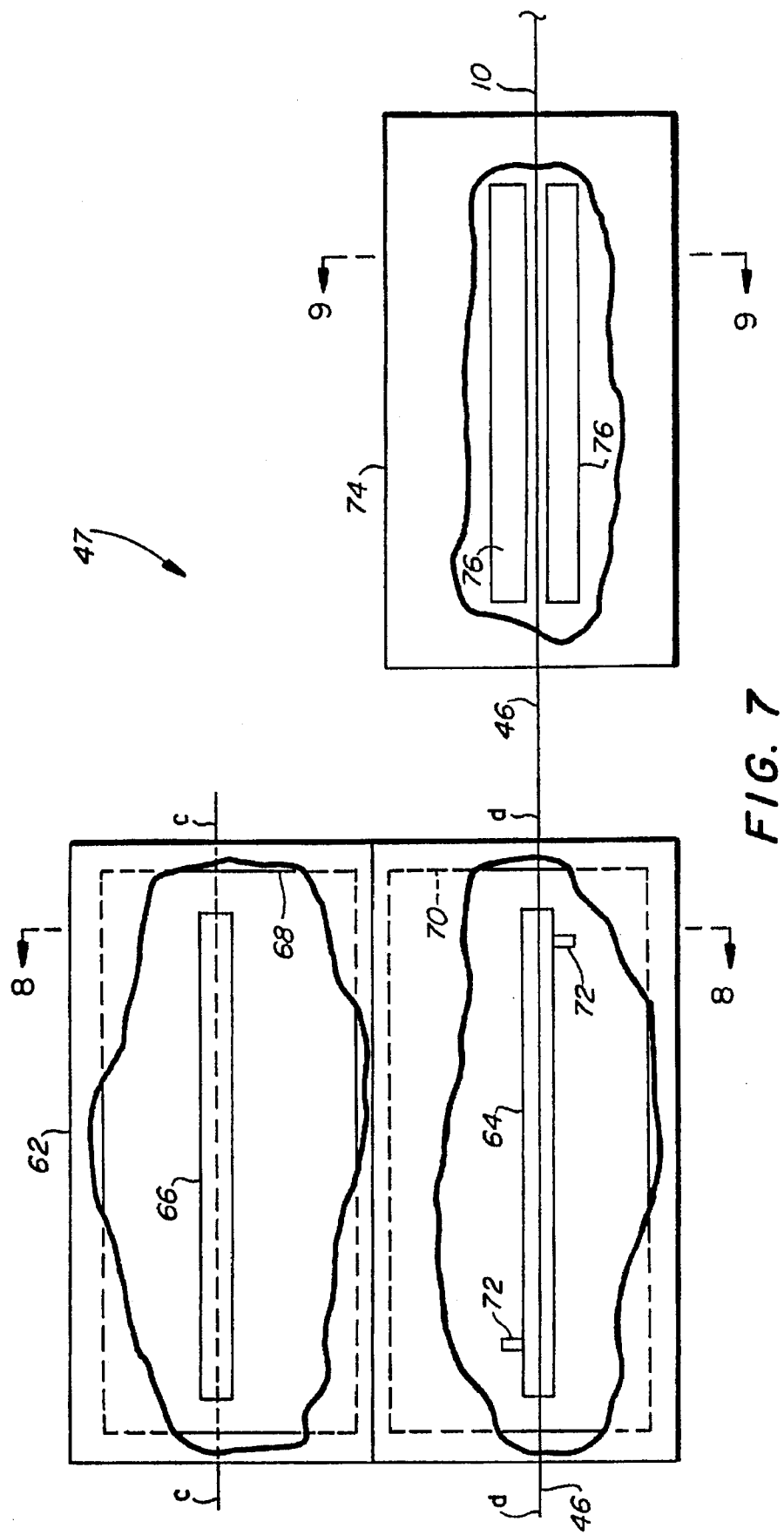
FIG. 7 is a plan view of the two-stage ultraviolet light curing station.
Figure 8:
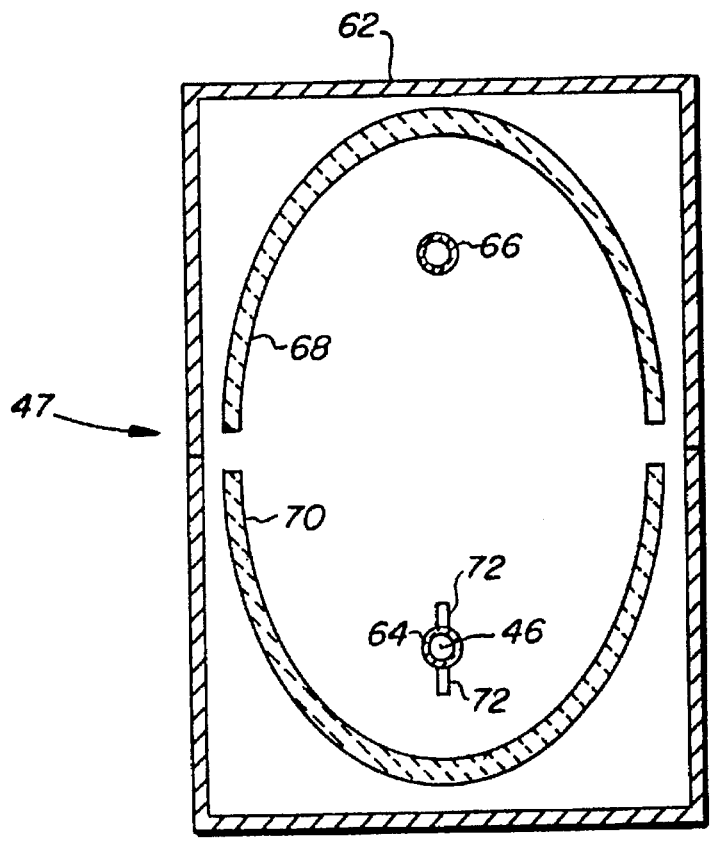
FIG. 8 is a cross-sectional end view of the medium intensity ultraviolet light curing station along line 8—8 of FIG. 7.
Figure 9:
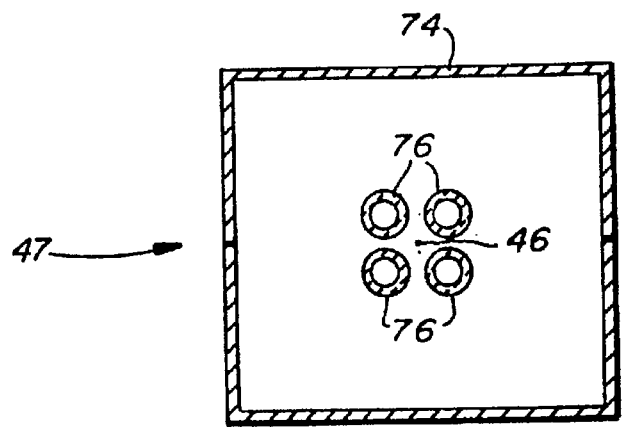
FIG. 9 is a cross-sectional view of the low intensity ultraviolet light curing station along line 9—9 of FIG. 7.

An alternative to the single-stage method for curing matrix 46 as described above, is a two-stage curing method illustrated in FIGS. 7, 8, and 9, collectively, wherein after exiting aperture 44 shown in FIGS. 2 and 3, matrix 46 enters lamp housing 62. Within the lamp housing, the matrix passes through a quartz tube 64 through which it is irradiated at a medium intensity of 5000 to 10,000 microwatts/cm$^2$ by an electromagnetic radiation source 66 emitting ultraviolet light at a wavelength of approximately 290 nanometers. The ultraviolet light polymerizes an outer layer of matrix 46. Quartz tube 64 shields matrix 46 from infrared heat generated by electromagnetic radiation source 66 while being transparent to ultraviolet radiation. The longitudinal axis of electromagnetic radiation source 66 is coincident with a focal axis c—c of a semi-elliptically shaped mirror 68. The longitudinal axis of quartz tube 64 is coincident with a focal-axis d—d of a semi-elliptically shaped mirror 70. The reflective concave surface of mirror 68 faces the reflective concave surface of mirror 70 so that the reflective surfaces of both mirror define an elliptical mirror having focal axis c—c and d—d.

Ultraviolet light from electromagnetic radiation source 66 both propagate directly towards matrix 46 and reflects off of mirror 68 to mirror 70, and then converges on focal axis d—d so that matrix 46 is irradiated from a 360° field. Dry nitrogen injected into quartz tube 64 through nipples 72 displaces oxygen which can inhibit polymerization of the outer layer of matrix 46 and cools the matrix while it cures.

Referring to FIGS. 7, 8, and 9, collectively, after existing lamp housing 62, partially cured matrix 46 enters lamp housing 74 where it passes between four low intensity ultraviolet lamps 76 which irradiate matrix 46 with ultraviolet light having a wavelength of about 360 nanometers at a relatively low intensity of approximately 2,000 microwatts/cm$^2$. This second curing stage completes polymerization of matrix 46 into a completely cured microcable 10. The purpose of this two-stage process is to limit the overall temperature rise of the curing microcable matrix to no more than 100° C.

Returning to FIGS. 2 and 3, after curing, completed fiber optic microcable 10 is then taken up at constant speed onto a storage spool 78 driven by means readily understood by one skilled in this art, as for example, by an electric motor 80 coupled to the spool by a "V"-belt 82. The fiber optic microcable may then be stress relieved by soaking the cooled fiber optic microcable in an approximately 70° C. atmosphere for about four hours and then allowing it to air cool.

Of course, addtional layers of sheathing or jacketing, which may or may not include UV cured resin, could be applied to microcable 10, as would be well known by those skilled in this field of technology.

A suitable resin has a Young's Modulus ranging from approximately 700,000 to 2,500,000 kPa after cure, a post-cure tensile strength of approximately 28,000 to 56,000 kPa, an uncured viscosity of less than 250 centipoise within the range of 27° C. to 60° C., moisture absorption of less than one percent in 24 hours of water immersion after cure, strain to failure of 1½% after cure, and a glass transition temperature from 60° C. to 105° C. after cure. Furthermore, resin 36 polymerizes or cures when exposed to electromagnetic radiation having a wavelength anywhere from 290 to 400 nanometers. Good results have been obtained with ultraviolet light curable resins such as DeSoto, Inc. No. 3287-5-9, Master Bond, Inc. No. 17D-1A and Borden 251-138-4.

While the invention has been described as having used ultraviolet light curable resin, it is to be understood that it is within the scope of the invention for other electromagnetic radiation curable resins to be used, as for example, resin cured upon exposure to visible light or electron beam radiation in conjunction with an electromagnetic radiation source having a wavelength capable of polymerizing the resin.

Obviously, many modifications and variations of the present invention are possible in the light of the above teachings. It is therefore to be understood that within the scope of the appended claims the invention may be practiced otherwise than as specifically described.

We claim:

1. A fiber optic microcable, comprising:

an optical fiber core;

a buffer surrounding said core;

a sheath surrounding said buffer, said sheath formed of an ultraviolet light cured resin having a post-cure Young's modulus ranging from approximately 700,000 to 2,500,000 kPa, a post-cure tensile strength of approximately 28,000 to 56,000 kPa, a post-cure moisture absorption of less than one per cent after 24 hours of water immersion, said resin having an uncured viscosity of less than 250 centipoise within the range of 27° C. to 60° C., and a glass transition temperature ranging from 60° C. to 105° C.; and a plurality of fibers embedded in said sheath.

2. The microcable of claim 1 wherein:

said resin is cured upon exposure to ultraviolet light having a wavelength anywhere from 290 to 400 nanometers.

3. A fiber optic microcable, comprising:

an optical fiber core;

a buffer surrounding said core;

a sheath surrounding said buffer, said sheath formed of an ultraviolet light cured resin having a post-cure Young's modulus ranging from approximately 700,000 to 2,500,00 kPa, said resin having an uncured viscosity of less than 250 centipoise within the range of 27° C. to 60° C.; and a plurality of fibers embedded in said sheath.

4. The microcable of claim 3 wherein:

said resin has a post-cure tensile strength of approximately 28,000 to 56,000 kPa.

5. The microcable of claim 4 wherein:

said resin has a post-cure moisture absorption of less than one per cent after 24 hours of water immersion.

6. The microcable of claim 5 wherein:

said resin has a glass transition temperature ranging from 60° C. to 105° C.

7. The microcable of claim 6 wherein:

said resin is cured upon exposure to ultraviolet light having a wavelength anywhere from 290 to 400 nanometers.

8. A fiber optic microcable, comprising:

an optical wave guide having a buffered outer coating;

a plurality of fibers placed around said buffered optical waveguide, said fibers wetted with an ultraviolet light curable resin having a post-cure Young's modulus ranging from approximately 700,000 to 2,500,000 kPa, a post-cure tensile strength of approximately 28,000 to 56,000 kPa, a post-cure moisture absorption of less than one per cent after 24 hours of water immersion, said resin having an uncured viscosity of less than 250 centipoise at 27° C., and a glass transition temperature ranging from 60° C. to 105° C.; and a sheath surrounding said buffered optical waveguide, said sheath manufactured by curing said ultraviolet light cured.

9. The microcable of claim 8 wherein:

said resin is cured by exposing said resin to ultraviolet light having a wavelength anywhere from 290 to 400 nanometers at an intensity, I, incident upon said wetted fibers, where I≦100,000 microwatts/cm².

10. The microcable of claim 9 wherein:

said fibers are placed around said buffered optical waveguide by passing said wetted fibers and buffered optical waveguide through a forming die.

11. The microcable of claim 10 wherein:

said fibers are oriented around said buffered optical waveguide by passing said wetted fibers and buffered optical waveguide through a comb plate.

12. The microcable of claim 11 wherein:

said sheath is cooled in a nitrogen atmosphere.

13. The microcable of claim 8 wherein:

said resin is partially cured by exposing said resin to ultraviolet light having a wavelength of approximately 290 nanometers at an intensity, I, incident upon said resin, where 5,000 microwatts/cm² ≦I≦10,000 microwatts/cm², and then curing said resin by exposing said resin to ultraviolet light having an intensity of approximately 2,000 microwatts/cm² incident upon said resin and a wavelength of approximately 360 nanometers.

14. The microcable of claim 13 wherein:

said fibers are placed around said buffered optical waveguide by passing said wetted fibers and buffered optical waveguide through a forming die.

15. The microcable of claim 14 wherein:

said fibers are oriented around said buffered optical waveguide by passing said wetted fibers and buffered optical waveguide through a comb plate.

16. The microcable of claim 15 wherein:

said sheath is cooled in a nitrogen atmosphere.

17. A fiber optic microcable, comprising:

an optical fiber core;

a buffer surrounding said core;

a sheath surrounding said buffer, said sheath formed of an ultraviolet light cured resin having a post-cure Young's modulus ranging from approximately 700,000 to 2,500,000 kPa, a post-cure tensile strength of approximately 28,000 to 56,000 kPa after 72 hours of immersion in water having a temperature of 23° C., a post-cure moisture absorption of less than one per cent after 24 hours of water immersion, said resin having an uncured viscosity of less than 250 centipoise within the range of 27° C. to 60° C., and a glass transition temperature ranging from 60° C. to 105° C.; and a plurality of fibers embedded in said sheath.

18. The fiber optic microcable of claim 1 wherein said plurality of fibers are fiberglass.

19. The fiber optic microcable of claim 18 wherein said fiberglass is electrical grade, continuous glass, G size glass filament fiberglass.

20. A fiber optic microcable, comprising:

an optical fiber core;

a buffer surrounding said core;

a sheath surrounding said buffer, said sheath formed of an ultraviolet light cured resin having a post-cure Young's modulus ranging from approximately 700,000 to 2,500,000 kPa, a post-cure tensile strength of approximately 28,000 to 56,000 kPa, said resin having an uncured viscosity of less than 250 centipoise within the range of 27° C. to 60° C.; and a plurality of fibers embedded in said sheath.

21. A fiber optic microcable, comprising:

an optical fiber core;

a buffer surrounding said core;

a sheath surrounding said buffer, said sheath formed of an ultraviolet light cured resin having an uncured viscosity of less than 250 centipoise within the range of 27° C. to 60° C.; and a plurality of fibers embedded in said sheath.

* * * * *